United States Patent [19]

Tsuda

[11] Patent Number: 4,679,207
[45] Date of Patent: Jul. 7, 1987

[54] SINGLE CHANNEL TRACKING FOR FREQUENCY HOPPING COMMUNICATION SYSTEMS

[75] Inventor: George I. Tsuda, Fullerton, Calif.

[73] Assignee: Hughes Aircraft Company, Los Angeles, Calif.

[21] Appl. No.: 758,601

[22] Filed: Jul. 24, 1985

[51] Int. Cl.$^4$ .................. H04L 27/30; G01S 13/52
[52] U.S. Cl. ............................... 375/1; 342/149; 455/273
[58] Field of Search .............. 343/16 M; 375/1, 2.2; 455/137, 273; 342/80, 147, 149, 152, 383, 384

[56] References Cited

U.S. PATENT DOCUMENTS

| | | | |
|---|---|---|---|
| 3,772,695 | 11/1973 | Hoffman | 343/16 M |
| 3,921,171 | 11/1975 | Strother, Jr. et al. | 343/16 M |
| 4,346,382 | 8/1982 | Bosc et al. | 342/152 |
| 4,387,373 | 6/1983 | Lonquemare, Jr. | 342/149 |
| 4,449,127 | 5/1984 | Sanchez | 343/16 M |
| 4,527,161 | 7/1985 | Wehner | 343/16 M |

*Primary Examiner*—Benedict V. Safourek
*Attorney, Agent, or Firm*—Thomas A. Runk; Anthony W. Karambelas

[57] ABSTRACT

A single channel antenna tracking system for frequency-hopping communication systems. The tracking system utilizes the synchronization pulses accompanying the frequency-hopping data bursts. The receive antenna system includes an antenna feed network for providing sum and difference antenna receive signals. The tracking system comprises a tracking switch circuit which normally switches the antenna system sum signal to the receiver during reception of a frequency-hopping data burst. During the reception of an agile synchronization pulse, however, the switching system is adapted to timeshare between the antenna sum signal and the difference signal or signals. During the synchronization pulse duration, the receiver thus receives a single waveform which during one portion of the sync pulse represents the sum signal and during one or two other portions represents the difference signals. The respective sum and difference signals may then be processed to determine the antenna tracking error. Only one channel is required for both the sum and difference signals, thereby minimizing the cost of the tracking system.

19 Claims, 6 Drawing Figures

SINGLE CHANNEL TRACKING FOR FREQUENCY HOPPING COMMUNICATION SYSTEMS

BACKGROUND OF THE INVENTION

The present invention relates to antenna tracking systems for accurately positioning an antenna toward a radiation source, and more particularly for tracking a beaconless communication transmitter, for example, in a frequency-hopping spread-spectrum communication system.

Spread spectrum communication has been described as a means of data communication in which the signal occupies a larger bandwidth than the minimum necessary to send the information. The spreading of the signal over the band is accomplished by means of a code which is independent of the data, and a synchronized reception with the code at the receiver is used for despreading and subsequent data recovery. *Theory of Spread-Spectrum Communications—A Tutorial,* R. L. Pickholtz, D. L. Schilling and L. R. Milstein, IEEE Trans. Commun., Vol. COM-30, pp. 855–884, May, 1982.

In frequency hopping spread spectrum communication systems, such as time division multiple access (TDMA) systems, agile synchronization pulses, i.e., pulses whose frequency may vary within a frequency band of interest, are placed in a predetermined manner within that frequency band. The conventional purpose of these synchronization pulses is to allow the receiver to acquire and track the frequency and phase of the communication signal. The synchronization pulses themselves typically include no data messages.

Typically, the approximate location of a mobile spread spectrum transmitter is knowm. This would allow the receive antenna to coarsely track the transmitted signal. It is understood that, typically, the receive antenna comprises an omnidirectional antenna or a fixed directional antenna, so that a tracking system may not be required. Insofar as is known to applicant, the conventional frequency-hopping communications systems without beacons do not employ means for achieving fine or closedloop receive antenna tracking of the frequency-hopping signal. As a result, the communication link performance is not optimized, and may suffer degradation due to signal fading, poor signal tracking and the like.

In contrast with frequency-hopping spread spectrum communication systems, antenna tracking has long been employed in tracking radar applications, such as monopulse radars. The operation of monopulse radars are generally discussed in the *Radar Handbook,* edited by Merrill I. Skolnik, McGraw-Hill Book Company, 1970, at Section 21.4, pages 21-10 et seq.

The monopulse receiver typically is fed with radar return signals from a directional antenna system, comprising, for example, a multiple horn arrangement coupled to an antenna feed network. An amplitude-comparison type feed network is adapted to provide sum and difference (or error) signal patterns, as are well-known to those skilled in the art. The sum and difference signals are processed to provide error correction signals for correcting the antenna position.

The same tracking technique might be considered for communication signals employing a beacon or single frequency carrier signal, which can be used as a narrowband reference signal. Extension of the technique to frequency-hopping communication systems has not heretofore been achieved, however. For satisfactory operation, the phase relationship between the sum and difference channels would have to be maintained over the entire frequency band of interest. Thus, the frequency response characteristics of the elements comprising the respective sum and difference channels would have to be matched in performance over a much wider frequency band than is required of the tracking of a narrowband beacon, which would be difficult and expensive to achieve.

One tracking scheme that is believed to have been considered for frequency-hopping communication systems is a mechanical scanning system in which tracking information is obtained by rotating or nutating the feed or the main reflector, or by "wobbling" the subreflector in a Cassegrain system. This mechanical scheme tends to add bulk and weight to the receive antenna system. A further limitation is in the low scanning rate which degrades the tracking due to signal scintillation and fading.

It would therefore represent an advance in the art to provide an antenna tracking capability for frequency-hopping spread spectrum communication systems.

It would further be advantageous to provide a relatively simple, yet effective tracking system for wideband communication systems not employing a beacon signal.

SUMMARY OF THE INVENTION

The general purpose of the invention is to provide an antenna tracking system suitable for frequency hopping communication systems in which a fixed frequency beacon signal is not available. The system is intended to be employed in conjunction with a receive antenna feed network which provides sum and difference signals. The system includes an RF switching circuit for selectively coupling either the antenna sum signal or the antenna difference signal to the communication receiver. During reception of a synchronization pulse, the respective sum and difference signals are sequentially coupled to the receiver through a single preamplifier at predetermined time intervals. The receiver may then process the respective sum and difference signals to generate antenna position correction signals.

During the reception of communication data bursts, the switching circuit couples the antenna sum signals to the receiver for demodulation in the conventional manner. The switching system may be adapted to either X-Y or R-$\theta$ type antenna feed networks. The invention thus provides a single channel tracking system which requires only one preamplifier and receiver. This in turn facilitates the maintenance of the relative phase and amplitude relation between the signal paths for the sum and difference signals over the wide frequency band of interest. Potential tracking errors due to signal fading are alleviated due to the very rapid switching between the sum and difference signals.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE DISCLOSURE

The present invention comprises a novel tracking system for frequency-hoppng communication systems. The following description is presented to enable a person skilled in the art to make and use the invention, and is provided in the context of a particular application and its requirements. Various modifications to the preferred embodiment may be apparent to those skilled in the art, and the present invention is not intended to be limited to the embodiment shown, but is to be accorded the widest scope consistent with the principles and novel features disclosed herein.

The invention is well suited for use with a frequency-hopping (spread spectrum) communications system where a beacon system does not exist. The frequency-hopping code is known at the receiver, so that the instantaneous frequency of the frequency-hopped signal is known a priori at the receiver. Typically, the approximate location of the transmitter will also be known, allowing coarse pointing of the antenna system at the transmitter or radiation source.

Figure 3A:
FIGS. 3A-3C are plots representing a typical sync pulse and data burst and the received signal envelope during the sync pulse for the embodiments of FIGS. 2 and 4, respectively.

A frequency-hopping communication signal typically comprises a series of data bursts, with each burst centered at a different frequency in the frequency band. Agile synchronization pulses typically occur periodically, for example, at a rate of several sync pulses per second, for synchronizing the receiver operation. Following each sync pulse may be a number of data pulses or bursts of data. FIG. 3A illustrates respective sync pulse and data burst envelopes. These synchronization pulses are generally relatively long and include no communications messages.

In accordance with the invention, the synchronization pulses are utilized for antenna tracking purposes. Due to the length of such pulses, they can be divided into two or more subparts for utilization in a simple and low cost antenna tracking system.

A typical communication antenna can be employed with an antenna feed network to provide antenna sum and difference secondary patterns. As is well known to those skilled in the art, the sum signal antenna pattern represents the sum of the signals at each of the antenna elements, while the difference pattern represents the difference between the signals at selected groups (typically pairs) of the antenna elements. For example, for an X-Y antenna feed system, left and right horns are used to develop a difference signal in the azimuth direction, and a top and bottom horn pair are used to develop a difference signal in the elevation direction. The magnitude of the respective difference signal is indicative of the error or offset of the received signal from the effective antenna boresight. The sign of the difference signal can indicate the direction of the offset, e.g., left or right.

Figure 1:
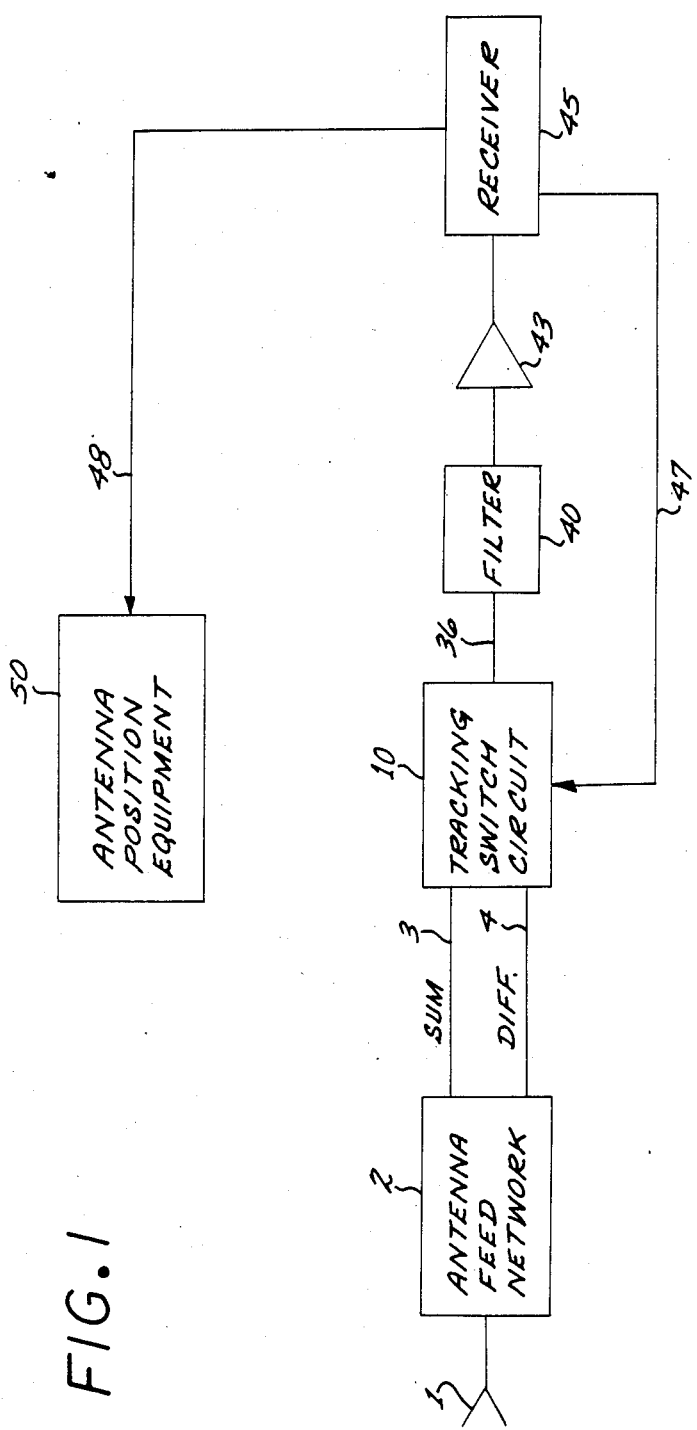
FIG. 1 is a simplified block diagram of a receive system for receiving frequency hopping communication signals which embodies a tracking system in accordance with the invention.

A simplified block diagram of a tracking system embodying the invention is shown in FIG. 1. The antenna system 1 is coupled to the antenna feed network 2. The system 1 and the feed network 2 cooperate to provide antenna sum and difference signals 3,4. The feed network 2 may comprise an X-Y feed network and provide azimuth and elevation difference signals. Other embodiments may employ an R-$\theta$ feed network, which provides only one difference signal and the sum signal, with the tracking information defined by the relative amplitude and phase of the difference signal with respect to the sum signal. The antenna system 1 and antenna feed network 2 are conventional in design and are not described in further detail.

The system shown in FIG. 1 further comprises a tracking switch circuit 10 which receives the sum and difference signals 3, 4, and couples a selected one of these signals to the receiver 45 through filter 40 and preamplifier 43. The selection of the appropriate sum or difference signal is determined by the state of switch control signals from the receiver 45 passed to the switching circuit 10 on line 47.

During reception of a data signal, the sum signal is normally coupled to the receiver, since it is typically of the higher magnitude. During reception of a sync pulse, however, the switching circuit couples the sum signal to the receiver for a first time interval, and the difference signal to the receiver for a second time interval. The receiver includes processing means for processing these signals to obtain tracking error signals, which are provided on line 48 to control the antenna position equipment 50.

Figure 2:
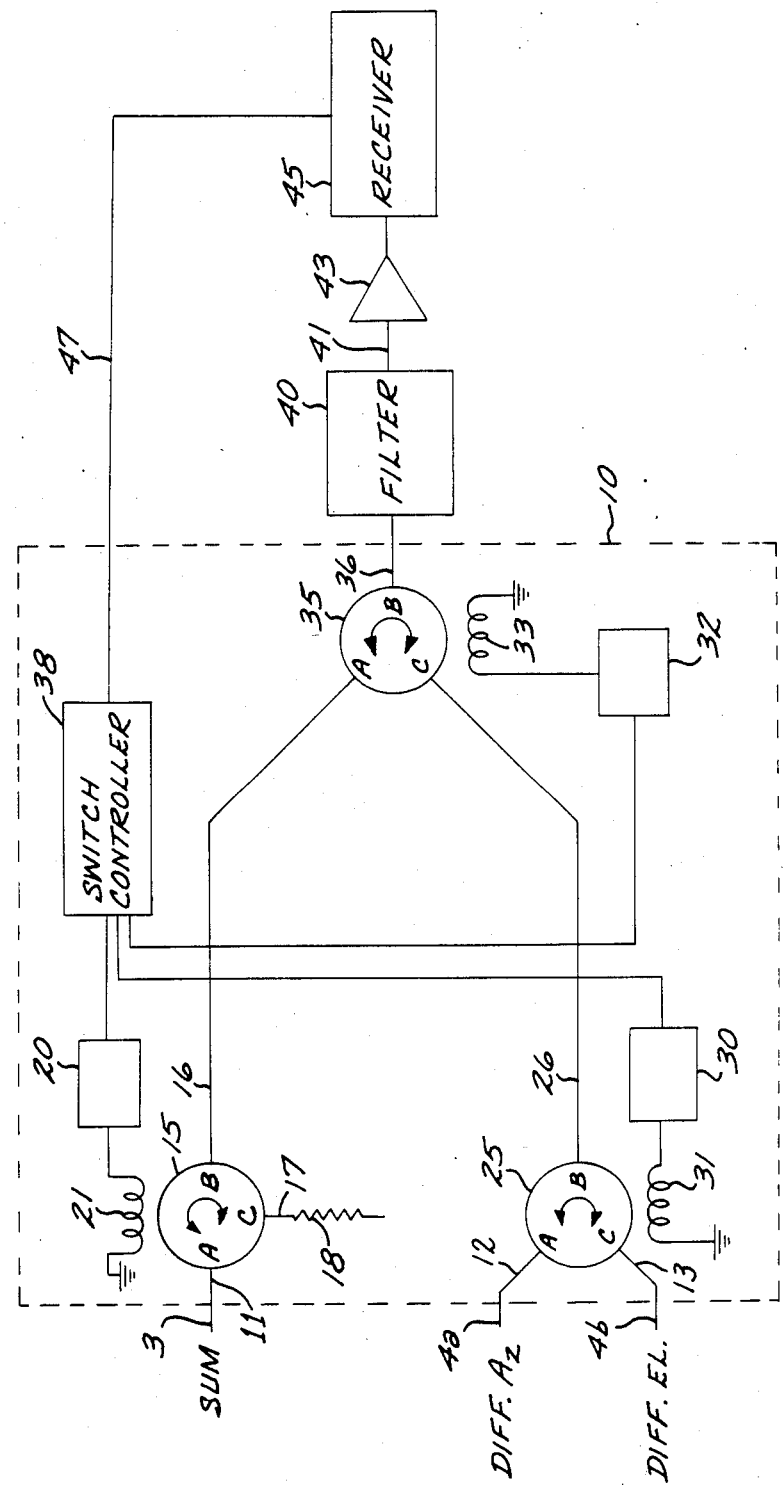
FIG. 2 is a simplified schematic of a switching circuit for the system shown in FIG. 1 for an X-Y antenna feed system.

FIG. 2 illustrates a simplified schematic of a tracking switch circuit 10 embodying the invention for an X-Y (azimuth and elevation) antenna feed system. The switching circuit 10 comprises switching circulators 15, 25, 35. In the disclosed embodiment, the circulators 15, 25, 35, are Faraday rotation type ferrite devices, comprising a section of waveguide containing low loss ferrite material and impedance matching elements. An external magnetic bias field is supplied to the ferrite core by a bifilar-wound solenoid. The switchable circulators are three port devices which circulate the RF signal incident at a particular port either to the adjacent port in the clockwise (CW) direction or to the adjacent port in the counterclockwise (CCW) direction, depending on the state of the applied magnetic field. For example, with circulator 15 biased for CW operation, an RF signal incident at port A will be circulated to port B, and isolated from port C, while an RF signal incident at port B will be circulated to port C and isolated from port A.

Each of the circulators 15, 25, 35 has associated therewith a corresponding solenoid 21, 31, 33 and respective driver circuit 20, 30, 32. The respective drivers are in turn controlled by a switch controller 38.

Switching circulators suitable for use in the disclosed embodiment are readily available. The units employed in this embodiment were obtained as three circulator modules from M/A-COM, INC. and have switching times of less than one-half microsecond.

As illustrated in FIG. 2, the antenna sum signal port 3 is coupled to port A of circulator 15 by transmission line 11. Port B of circulator 15 is coupled by transmission line 16 to port A of circulator 35.

The feed network azimuth difference signal port 4a is coupled to port A of circulator 25 by transmission line 12. The feed network elevation difference signal port 4b is coupled to port C of circulator 25 by transmission line 13. Port B of the circulator 25 is coupled to port C of the circulator 35 by transmission line 26.

The output of switching circuit 10 is taken at port B of circulator 35. This output is coupled to a bandpass filter 40 by transmission line 36. Filter 40 passes signals within the frequency-hopping band of interest and rejects out-of-band signals. For some applications filter 40 may not be required. The filtered signal is coupled by transmission line 41 to preamplifier 43. The amplified signal is provided to receiver 45.

During reception of an communication data signal, the antenna sum signal is typically coupled to the receiver 45. Switch circulators 15, 25, 35 are energized such that the signals travel through the circulator in the clockwise direction. The azimuth difference signal travels from port A to port B of circulator 25, from port C to port A of circulator 35, and from port B to port C of circulator 15, which is terminated in matched load 18. The sum signal travels from port A to port B of circulator 15, and from port A to port B of circulator 35.

To couple the difference signals to the receiver 45, the switched circulators 25, 35 are reversed such that the signal travels counterclockwise. The sum signal is then directed to the load 18 coupled to port C of circulator 15. The state of circulator 25 then determines whether the difference azimuth or difference elevation signal is passed to the receiver 45. With the circulator 25 energized for clockwise operation, the azimuth difference signal is passed to port C of circulator 35, where it travels to port B. If circulator 25 is energized for counterclockwise operation, the elevation difference signal is passed to the receiver 45.

With the arrangement of the switch circuit 10, the RF insertion phase delay and losses are equal for all input port to output port paths. In addition, only one filter (if necessary) 40 and one low noise preamplifier 43 are required.

The timing of the operation of the switch circuit 10 is synchronized with the receiver 45 operation. The receiver 45 comprises a highly accurate clock reference, permitting the receiver operation to be synchronized with the transmitter operation. The frequency hopping code and the timing of the occurrence of the synchronization pulses are predetermined at the receiver 45.

For normal communication signal reception, the switched circulators 15, 25, 35 are energized to direct the sum signal to the receiver 45 for demodulation. A typical scheme employed to modulate the data is differential phase shift keying (DPSK). For antenna tracking during the occurrence of the synchronization pulses, the sum and difference signals are timeshared by the receiver 45. Thus, the duration of the synchronization pulse is divided into three portions, with the switch circuit 10 switching the sum signal to the receiver 45 during one portion of the duration of the synchronization pulse, and the respective difference signals are switched to the receiver 45 during second and third portions of the duration of the synchronization pulse.

With the timing of the synchronization pulses known in advance at the receiver 45, the respective sum and difference signals may be processed in accordance with well-known processing techniques to derive antenna position correction signals. Exemplary processing techniques are generally described in the *Radar Handbook*, i.d., at pages 21-10 et seq.

FIG. 3 illustrates the operation of the switching circuit in synchronism with the received synchronization ("sync") pulse. FIG. 3A shows the envelope of a typical sync pulse and a typical data burst. The sync pulse is typically an unmodulated constant frequency signal at a predetermined one of the frequencies within the band of interest. For purposes of illustration, it may be assumed that the duration of the sync pulse is 100 microseconds. The data burst is typically an RF signal centered at the same frequency and modulated in accordance with the data. Thus, in the example of FIG. 3A, the exemplary sync pulse extends from time $t_1$ to time $t_2$, and the data burst extends from time $t_3$ to $t_4$.

In accordance with the invention, the switch circuit 10 is operated to couple the sum port signal to the receiver during a first portion of the sync pulse duration, the azimuth difference signal to the receiver during a second portion, and the elevation difference signal during a third such portion. Thus, with reference to FIG. 3B, the switch circuit 10 is operated to switch the sum port signal to the receiver 45 during the time interval from $t_1$ to $t_a$, to couple the azimuth difference signal to the receiver 45 from time $t_a$ to $t_b$, and to switch the elevation difference signal to the receiver 45 in the interval between time $t_b$ to $t_2$.

The receiver 45 is adapted to provide a controller signal on line 47 to the switch controller 38. The controller signal may simply be a reference pulse indicating the commencement of a sync pulse. The switch controller 38 may then comprise timer circuits for timing the respective first, second and third portions of the sync pulse duration and generating the appropriate circulator control signals to the respective driver circuits 20, 30, 32. The function of the switch controller 38 may be implemented directly in the receiver 45 as part of its processing function. Other implementations may readily appear to those skilled in the art.

Figure 3B:
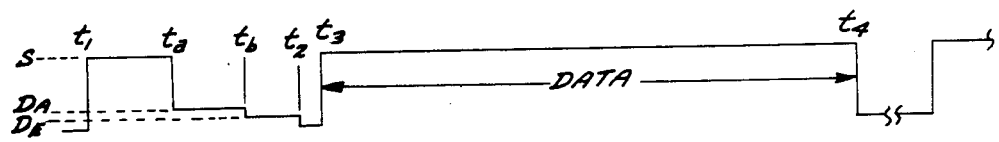

An exemplary received envelope waveform resulting from the operation of switch circuit 10 for an X-Y type feed network is illustrated in FIG. 3B. The sum signal is at magnitude S. The azimuth difference signal is at magnitude $D_A$. The elevation difference signal is at magnitude $D_E$. If the antenna is exactly positioned at the radiation source, the magnitudes of the difference signals will be zero. As the antenna pointing error increases, so does the appropriate difference signal magnitude. These respective sum and difference signals can then be processed using known techniques to develop antenna position error signals. The error signals may be used to control a conventional antenna position servo system (comprising equipment 50 in FIG. 1). The specific details of the antenna position equipment 50 are known in the art, (e.g., the *Radar Handbook*, i.d. at pages 21-34, et seq.) and are not described in further detail.

One of the advantages provided by the invention is that signal fading problems which could lead to tracking errors are minimized due to the relatively fast switching between the sum and difference ports. As a result, the respective sum and difference signals can generally be considered to be generated by a received signal of constant magnitude over the duration of the sync pulse.

Figure 4:
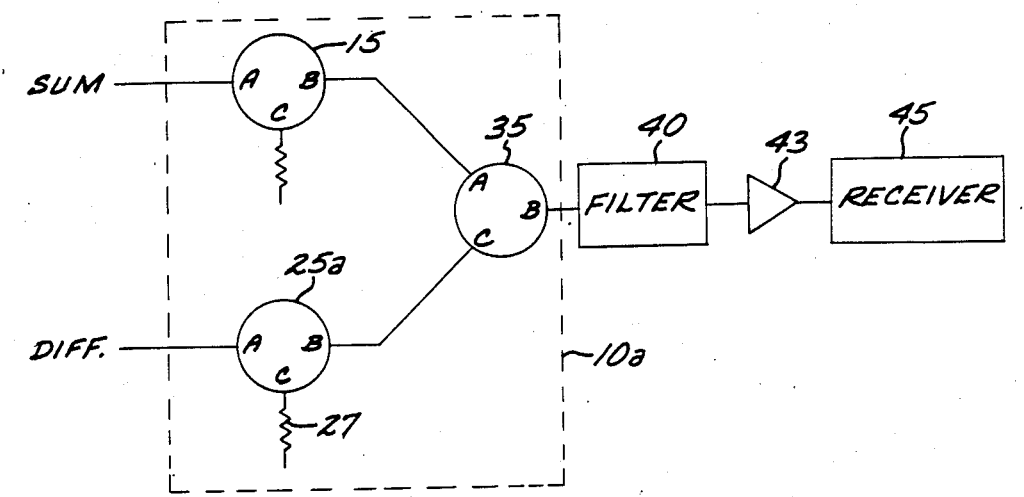
FIG. 4 is a simplified schematic of a switching circuit for the system shown in FIG. 1 for an R-$\theta$ antenna feed system.

Referring now to FIG. 4, an alternate embodiment of a switch circuit 10a is illustrated. The circuit 10a is adapted for use with an R-$\theta$ antenna feed system, wherein the antenna pointing error is defined in terms of a distance R and angular offset $\theta$ from the effective antenna boresight. In this alternate embodiment the port C of the circulator 25a is terminated in a matched load 27. For the R-θ antenna feed system, the distance R may be determined by the relative magnitude of the difference signal, and the angular offset θ is determined by the phase difference between the RF sum signal and the RF difference signal. Thus, the receiver 45 comprises phase and amplitude detectors for stripping the phase and amplitude information from the received signal during the sync pulse. For the sake of clarity, the solenoid and driver circuits associated with each switching circulator 15, 25a, 35, and the switch controller 38 have been omitted from FIG. 4.

Figure 3C:
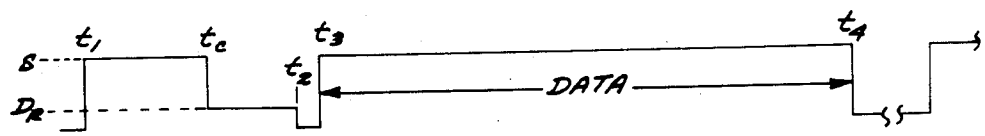

FIG. 3C illustrates an exemplary received signal envelope resulting from operation of the switch circuit 10a of FIG. 4. For this embodiment, the duration of the sync pulse is divided into two portions, with the sum signal directed to the receiver 45 during the time interval from $t_1$ to $t_c$, and the difference signal being directed to the receiver 45 during the time interval between $t_c$ and $t_2$. The magnitude of the sum signal is indicated as S, and the magnitude of the difference signal is indicated as $D_R$. The phase angle θ is determined by measuring the difference in the respective phases of the sum signal and the difference signal.

It is noted that circulator 15 is employed in the embodiments of FIGS. 2 and 4 to maintain the phase relationship between the sum signal path (or channel) and the difference signal path. Circulator 15 also provides higher isolation of the sum signal from the receiver when the switch network is operated to switch the difference signal to the receiver. The additional isolation is desirable because the magnitude of the sum port signal is generally greater than the magnitude of the difference port signal.

It will be apparent to those skilled in the art that the functions performed by the devices 15, 25, 25a, and 35 may in some applications be performed by devices other than switching circulators, such as diode or transistor switching circuits or phase shifting circuits. Circulators are considered preferable at high frequency ranges due to their relatively low insertion loss, however.

The circulators 15, 25, 25a, 35 should be matched for similar phase delay and insertion loss over the frequency band of interest and over the expected temperature range to which these devices will be subjected during operation. For this purpose, the switching circulators comprising the switch circuit 10 or 10a may be fabricated as a single integrated module or unit to equalize the temperature of each circulator.

At the receiver 45, for DPSK modulated signals, each agile sync pulse is typically downconverted and sent to DPSK demodulators, where phase and amplitude information are obtained from the single waveform. The relative strength of the sum to difference signal can be adjusted by varying the ratio of sync pulse splitting between the sum and difference ports, i.e., by adjusting the lengths of the portions of the sync pulse duration allocated to the respective sum and difference signals.

In summary, the following are some of the advantages provided by the present invention:
a. the tracking system is relatively simple because only one preamplifier and receiver are required;
b. the communication signal does not have a beacon;
c. the receive signal can frequency hop;
d. the phase and amplitude relationship between the communication and error signal paths may readily be maintained, since only one preamplifier and receiver are employed;
e. the sum-to-difference signal sensitivity can be optimized;
f. the tracking system can be used in conjunction with either X-Y or R-θ antenna feed systems; and
g. the signal fading problem is minimized due to very rapid switching between the sum and difference signals.

An antenna tracking system has been disclosed for tracking frequency hopping communication signals. While the invention has been described in the context of a frequency hopping spread spectrum communication link, it is not limited to this application, but may find utility with any agile sync pulse system. It is understood that the above-described embodiment is merely illustrative of the possible specific embodiments which can represent principles of the present invention. Other arrangements may readily be devised in accordance with these principles by those skilled in the art without departing from the scope of the invention.

What is claimed is:

1. An antenna tracking system for a frequency-hopping system employing agile synchronization pulses of a certain duration and a system receiver, comprising:
an antenna feed network for providing respective sum and difference signals at respective sum and difference ports; and
an RF switching circuit coupled to said sum and difference ports of said feed network and to the system receiver, said switching circuit for coupling the sum signal to said receiver during a first portion of said synchronization pulse and for coupling said difference signals to said receiver during a subsequent portion of said pulse;
wherein said receiver comprises processing means for providing antenna position error signals in dependence on said sum and difference signals.

2. The system of claim 1 wherein said frequency hopping system comprises a frequency hopping communication system employing agile synchronization pulses and data signals, and wherein said switching circuit couples said sum signal to said receiver during the reception of data signals.

3. The system of claim 1 wherein said RF switching circuit comprises a first RF switch comprising three ports, with a first port thereof coupled to said sum port, a second port coupled to said difference port and a third port coupled to said receiver, and wherein said first RF switch is operable in a first state for coupling said sum signal to said reciver for the first portion of said synchronization pulse and in a second state for coupling said difference signal to said receiver for the subsequent portion of said synchronization pulse.

4. The system of claim 3 wherein said antenna feed network provides elevation difference signals and azimuth difference signals at respective elevation difference and azimuth difference ports, and wherein said RF switching circuit further comprises a second RF switch comprising three ports, a first port thereof coupled to said elevation difference port, a second port thereof coupled to said azimuth difference port and a third port thereof coupled to said second port of said first RF switch, said second RF switch operable in a first state for coupling said elevation difference signal to said second port of said first RF switch and in a second state for coupling said azimuth difference signal to said second port of said first RF switch, whereby said sum signal is coupled to said receiver when said first RF switch is in said first state, said elevation difference signals are coupled to said receiver when said first RF switch is in said second state and said second RF switch is in said first state, and said azimuth difference signal is coupled to said receiver when said first and second RF switches are in the respective second states.

5. The system of claim 4 wherein the timing of the synchronization pulses is predetermined at said receiver, and said RF switching circuit further comprises control means for controlling the operation of said first and second RF switches, said control means being synchronized to said synchronization pulse for switching said first RF switch to said first state during a first portion of said pulse, for switching said first RF switch to said second state and said second switch to said first state during a second portion of said pulse, and for switching said first and second RF switches to said respective second states during a third portion of said pulse.

6. The system of claim 4 further comprising a third RF switch comprising three ports for coupling said sum port to said first port of said first RF switch, said sum port being coupled to a first port of said third RF switch, and a second port of said third port is coupled to said first port of said first RF switch, whereby the insertion loss and phase delay presented by the switching circuit to the respective sum and difference signals are equalized.

7. The system of claim 6 wherein said first, second and third RF switches comprise switching circulator devices, and wherein a third port of said third RF switch is terminated in a matched load.

8. The system of claim 3 wherein said antenna feed network comprises an R-θ type network, and said processing means comprises means for determining the magnitude and phase of said difference signal in relation to said sum signal.

9. The system of claim 1 wherein said RF switching circuit is adapted to present substantially equal impedances to the respective sum and difference signals over the frequency hopping bandwidth of interest to maintain the relative magnitudes and phases between the sum and difference signals existing at said sum and difference ports.

10. In a frequency hopping system employing synchronization pulses and comprising a receive antenna system, an antenna feed network for providing respective antenna sum and antenna difference signals and a receiver means, an improved antenna tracking system for providing antenna tracking error signals, comprising:

switching means for selectively coupling either said sum signals or said difference signals to said receiver in response to switch control signals;

switch controller means for providing switch control signals to said switching means so as to couple said sum signals to said receiver during a first portion of said synchronization pulse and to couple said difference signal to said receiver during a subsequent portion of said pulse; and wherein said receiver means comprises processing means for processing the sum and difference signals to provide said antenna tracking error signals.

11. The system of claim 10 wherein said switching means is adapted to present equal RF insertion loss and phase delay to the respective sum signals and difference signals at particular frequencies in the frequency band of interest.

12. The system of claim 10 wherein said switching means comprises a first RF switch comprising three ports, with a first port thereof coupled to receive said sum signals, a second port coupled to receive said difference signals and a third port coupled to said receiver, and wherein said first switch is operable in a first state for coupling said sum signal to said receiver for the first portion of said synchronization pulse and in a second state for coupling said difference signal to said receiver for the subsequent portion of said synchronization pulse.

13. The system of claim 12 wherein said antenna feed network provides elevation difference signals and azimuth difference signals at respective elevation difference and azimuth difference ports, and wherein said switching means further comprises a second RF swtich comprising three ports, a first port thereof coupled to receive said elevation difference signals, a second port thereof coupled to receive said azimuth difference signals and a third port thereof coupled to said second port of said first RF switch, said second RF switch operable in a first state for coupling said elevation difference signal to said second port of said first RF switch and in a second state for coupling said azimuth difference signal to said second port of said first RF switch, whereby said sum signal is coupled to said receiver when said first RF switch is in said first state, said elevation difference signals are coupled to said receiver when said first RF switch is in said second state and said second RF switch is in said first state, and said azimuth difference signal is coupled to said receiver when said first and second RF switches are in the respective second states.

14. The system of claim 13 wherein the timing of the synchronization pulses is predetermined at said receiver means, and said switching means further comprises control means for controlling the operation of said first and second RF switches, said control means being synchronized to said synchronization pulse for switching said first RF switch to said first state during a first portion of said pulse, for switching said first RF switch to said second state and said second switch to said first state during a second portion of said pulse, and for switching said first and second RF switches to said respective second states during a third portion of said pulse.

15. The system of claim 13 further comprising a third RF switch comprising three ports for coupling said sum port to said first port of said first RF switch, said sum port being coupled to a first port of said third RF switch, and a second port of said third port is coupled to said first port of said first RF switch, whereby the insertion loss and phase delay presented by the switching means to the respective sum and difference signals are equalized.

16. The system of claim 15 wherein said first, second and third RF switches comprise switching circulator devices, and wherein a third port of said third RF switch is terminated in a matched load.

17. The system of claim 10 wherein said antenna feed network comprises an R-θ type network, and said processing means comprises means for determining the magnitude and phase of said difference signal in relation to said sum signal.

18. The system of claim 10 wherein said RF switching circuit is adapted to present substantially equal impedances to the respective sum and one of said difference signals over the frequency hopping bandwidth of interest to maintain the relative magnitudes and phases between the sum and difference signals existing at said feed network.

19. A receive antenna tracking system for a frequency hopping communication system employing agile synchronization pulses, comprising:
- a receive antenna system comprising a plurality of antenna elements;
- a receive antenna feed network coupled to the respective antenna elements for providing antenna sum signals, antenna azimuth difference signals and antenna elevation difference signals;
- a communication receiver means; and RF switching means for selectively coupling either said sum signals or one of said difference signals to said receiver means, said switching means comprising:
  first, second and third three port RF switch circulators, and wherein
  a first port of said first RF switch circulator receives said sum signal, a second port thereof is coupled to a first port of said second RF switch, and a third port thereof is terminated in a matched load;
  a second port of said second RF switch circulator is coupled to said receiver means; and
  a first port of said third RF circulator switch receives said elevation difference signal, a second port thereof is coupled to a third port of said second RF switch circulator and a third port of said third RF switch circulator receives said azimuth difference signal;
  whereby said sum signals are coupled to said receiver when said first and second RF switch circulators are switched to a first state, and one of said difference signals is coupled to said receiver when said first and second RF switch circulators are switched to a second state, the particular one of said difference signals being dependent on the state of said third RF switch circulator.

* * * * *